United States Patent [19]

Winchel

[11] Patent Number: 4,546,942
[45] Date of Patent: Oct. 15, 1985

[54] PORTABLE PLATFORM FOR SLIDE PROJECTION

[76] Inventor: Joseph F. Winchel, 1605 Oakhorne Dr., Harbor City, Calif. 90710

[21] Appl. No.: 597,846

[22] Filed: Apr. 9, 1984

[51] Int. Cl.[4] ............................................. F16M 11/04
[52] U.S. Cl. .................................. 248/187; 248/371; 248/653
[58] Field of Search ............... 248/653, 187, 177, 371, 248/185, 184, 183

[56] References Cited

U.S. PATENT DOCUMENTS

| | | | |
|---|---|---|---|
| 180,806 | 8/1876 | Striegel | 248/185 X |
| 651,521 | 6/1900 | Bigsby-Chamberlin | 248/187 |
| 812,233 | 2/1906 | Rock | 248/187 |
| 1,357,639 | 11/1920 | Kroedel | 248/187 |

Primary Examiner—Ramon S. Britts
Assistant Examiner—Karen Chotkowski

[57] ABSTRACT

This platform provides a portable and convenient support for a slide projector. Primarily, it consists of a plate, which is received on the bolt of the head of a tripod. It further includes a knurled nut, for tightening the plate secure to the tripod, which may be elevated to any desired height and angle.

1 Claim, 7 Drawing Figures

PORTABLE PLATFORM FOR SLIDE PROJECTION

This invention relates to film projection devices, and more particularly to a portable platform for slide projection.

The principal object of this invention is to provide a portable platform for slide projection, which will be adaptable for attachment to the top of an ordinary camera tripod, for supporting a slide projector.

Another object of this invention is to provide a portable platform for slide projection, which will be so designed, as to fit inside the common slide tray carton, beneath the slide tray, for ease of portability, and storage when not in use.

Another object of this invention is to provide a portable platform for slide projection, which will be of such design, that the bolt which attaches a camera to the tripod will be employed to attach the present invention thereto.

A further object of this invention is to provide a portable platform for slide projection, which will be especially convenient for use by those who travel and project slide programs, and the user will always be sure that he will have a suitable platform that will be adjustable in elevation, as desired, for properly projecting slides.

A still further object of this invention is to provide a portable platform for slide projection, which will be of such design, as to fit in a small carrying case with the slide tray, the projector, and the tripod, while the total weight will be less than twenty-five pounds.

Other objects are to provide a portable platform for slide projection, which is simple in design, inexpensive to manufacture, rugged in construction, easy to use, and efficient in operation.

These, and other objects, will be readily evident, upon a study of the following specificiation, and the accompanying drawing, wherein.

Figure 1:
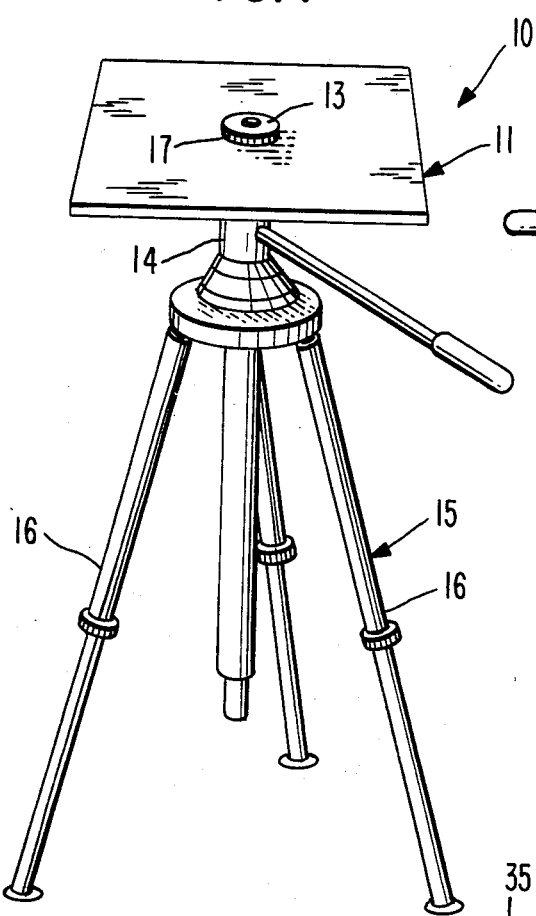
FIG. 1 is a perspective view of the present invention.
Figure 2:
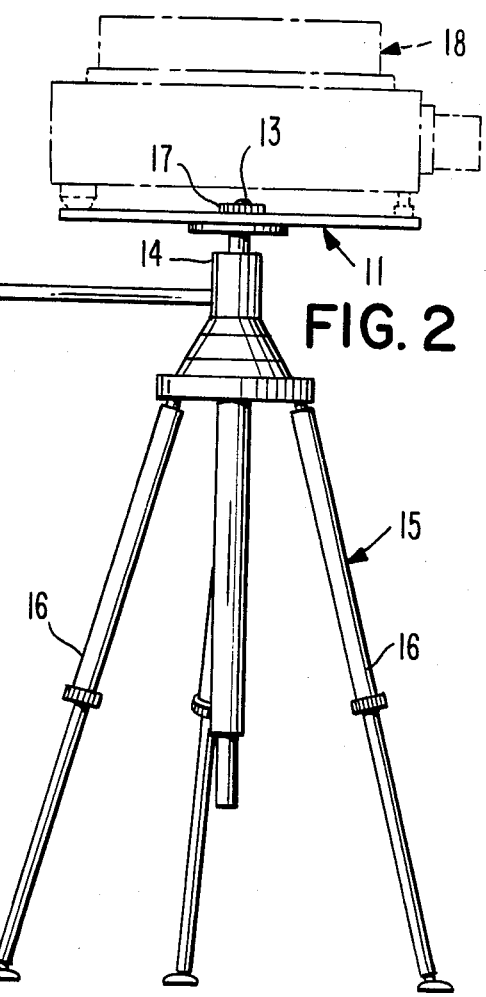
FIG. 2 is a side elevational view of FIG. 1, showing a typical slide projector thereon, which is illustrated in phantom lines.
Figure 3:
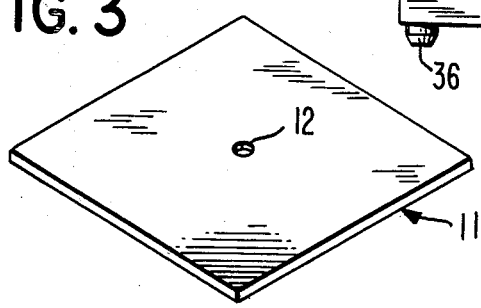
FIG. 3 is a perspective view of the plate, shown removed from the tripod.

Accordingly, a platform 10 is shown to include a square configurated plate 11 of suitable light weight material. A central vertical opening 12 is provided through plate 11, for freely receiving the common bolt fastener 13, which projects upwards from the head 14 of a typical tripod 15, having telescoping legs 16. A knurled circular nut fastener 17 is provided, having the same thread size as the bolt fastener 13, and is used to receive fastener 13, so as to tighten plate 11 secure to head 14, to support slide projector 18 safely thereon. A small carrrying case may also be provided (which is not shown), so as to receive the above-described, along with a slide tray.

In use, tripod 15 is first set up in the usual manner, and adjusted to the elevation desired. The plate 11 is then placed on the bolt fastener 13, by means of opening 12 therethrough. The nut fastener 17 is then placed on fastener 13, and rotated clockwise until it engages the top of plate 11, and forces the bottom of plate 11 against the top of head 14. The projector 18 is then positioned on top of plate 11, and is used to project slides.

Figure 4:
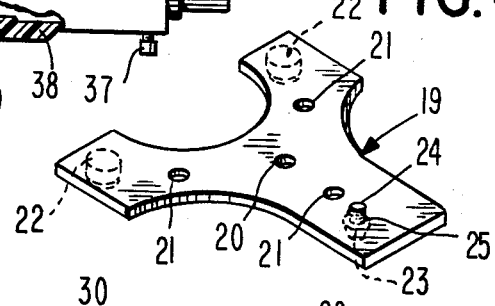
FIG. 4 is a perspective view of a modified form of the invention.

Looking now at FIG. 4 of the drawing, a modified plate 19 is shown to be of "Y"-shaped configuration, having a central opening 20 therethrough, and three similar openings 21 are equally and radially spaced from opening 20. The three openings 21 serve to receive freely suitable screw or bolt fasteners (not shown), so as to mount plate 19 to the bottom of a slide projector housing, having similarly spaced openings for receiving the abovedescribed fasteners. The bottom surface of plate 19 includes a pair of rear and spaced feet 22, which are suitably fixedly secured thereto, and a front and forward foot 23 includes an externally threaded portion 24, which is threaded into threaded opening 25 through plate 19, so as to provide fine adjustable elevation for the forward end of the projector, to which plate 19 is attached when plate 19 is resting upon a flat surface to project slides. The central opening 20 serves to receive the bolt fastener 13 of tripod 15, heretofore described, and plate 19 is secured to tripod 15 by nut fastener 17, in the same manner described, when it is desired to mount plate 19 to the tripod 15.

In use, plate 19 functions in the same manner described of plate 11, with the exception, that it is permanently secured to the bottom of a projector housing, and, when not mounted to tripod 15, it is used on any suitable table or the like, and the front is elevatable in fine adjustment, by threading the foot 23 up or down, as desired.

Figure 5:
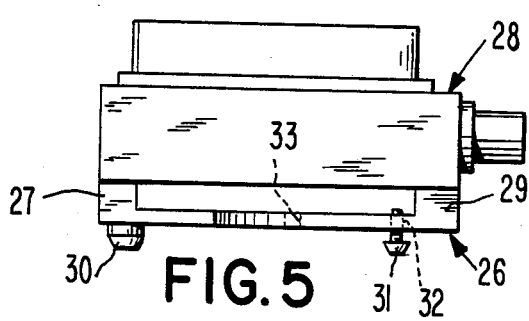
FIG. 5 is a side elevational view of another modified form of the invention, which is integrally attached to a projector.
Figure 6:
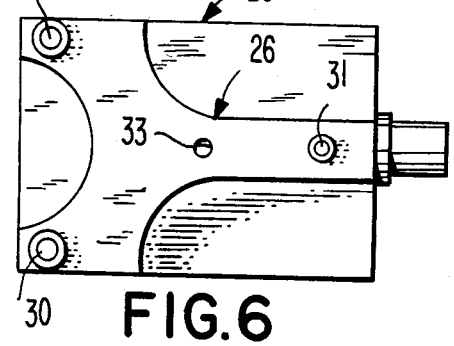
FIG. 6 is a bottom plan view of FIG. 5.

Looking now at FIGS. 5 and 6, another modified form of plate 26 is similar in configuration, as was described of plate 19. However, plate 26 includes a pair of spaced rear legs 27, which extend upward, and are fixedly secured to the plate 26 and the bottom of a projector 28, in a suitable manner (not shown). The front of plate 26 includes a single upwardly extending leg 29, which is also secured fixedly to both plate 26 and the bottom of the front of projector 28, in a suitable manner. A pair of spaced rear feet 30 are fixedly secured to the bottom of plate 26 in a suitable manner, and a front foot 31, for fine adjustment in elevation, is similar to the foot 23, heretofore described of plate 19, and is threaded into opening 32 through plate 26. An opening 33 extends through the center of plate 26, and serves to receive the bolt fastener 13 of tripod 15, and projector 28 is rendered secure to tripod 15, by the nut fastener 17 being tightened down, in the manner heretofore described of plates 11 and 19.

In use, the function of plate 26 is similar to that described of plate 19, with the exception, that its legs 27 and 29 space it from the bottom of projector 28.

Figure 7:
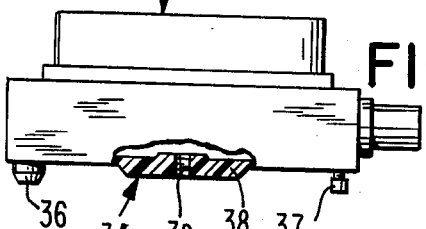
FIG. 7 is a side elevational view of still another modified form of the invention, which is shown partly broken away.

Referring now to FIG. 7, a further modified form of plate 34 is suitably secured to the bottom of projector 35, in a manner (not shown), and plate 34 includes a pair of rear feet 36 and an adjustable front foot 37. The feet 36 and 37 are similar in design to that of the feet 22, 23, 30, and 31 of plates 19 and 26, respectively. The center of plate 34 is provided with a heavy reinforced portion 38, which includes a threaded opening 39 therethrough, and 39 removably receives the bolt fastener 13 of tripod 15, and the clockwise rotation of projector 35 serves to tighten the projector 35 secure to the head 14 of tripod 15.

In use, the opening 39, of plate 34, is aligned with, and threaded onto bolt fastener 13 of tripod 15, and projector 35 is rotated clockwise until 35 is rigidly held in place on tripod 15. When 15 is not used, the legs 36 and 37 of plate 34 function in the same manner as described of feet 22, 23, 30, and 31 of plates 19 and 26, respectively.

It shall be noted, that the combination of plate 11 and tripod 15 may be employed to elevate and support various articles, as necessity dictates.

While various changes may be made in the detail construction, it is understood that such changes will be within the spirit and scope of the present invention, as is defined by the appended claims.

What I now claim is:

1. A portable platform for slide projection, comprising, in combination, a plate of suitable lightweight material, an opening through a center of said plate, a tripod having an upwardly extending screw fastener affixed upon a top thereof and extending through said opening, a knurled circular nut fastener being removably threadedly engaged with said screw fastener on the side of said plate opposite said tripod, a plurality of three projector-fastening similar openings through said plate being equally and radially spaced from the first said opening, said plate being of "Y"-shaped configuration and including a pair of rearward extensions and a single forward extension, a foot affixed to an underside of each said rearward extension and an adjustable foot under said forward extension including an externally threaded portion threadedly engaged in a threaded opening through said forward extension for adjusting forward tilt of said plate.

* * * * *